United States Patent
Smirnov

(10) Patent No.: US 10,692,191 B2
(45) Date of Patent: Jun. 23, 2020

(54) PER-PIXEL PHOTOMETRIC CONTRAST ENHANCEMENT WITH NOISE CONTROL

(71) Applicant: Apple Inc., Cupertino, CA (US)

(72) Inventor: Maxim Smirnov, Wilsonville, OR (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 16/100,833

(22) Filed: Aug. 10, 2018

(65) Prior Publication Data

US 2020/0051215 A1    Feb. 13, 2020

(51) Int. Cl.
*G06T 5/00* (2006.01)
*G06T 3/40* (2006.01)
*G06T 5/20* (2006.01)

(52) U.S. Cl.
CPC ............ *G06T 5/002* (2013.01); *G06T 3/40* (2013.01); *G06T 5/003* (2013.01); *G06T 5/008* (2013.01); *G06T 5/20* (2013.01)

(58) Field of Classification Search
CPC .......... G06T 5/002; G06T 3/40; G06T 5/008; G06T 5/003; G06T 5/20
See application file for complete search history.

(56) References Cited

U.S. PATENT DOCUMENTS

| | | | |
|---|---|---|---|
| 7,426,312 B2 * | 9/2008 | Dance | G06T 5/40 382/254 |
| 7,643,699 B2 * | 1/2010 | Lim | G06T 5/002 382/275 |
| 8,532,429 B2 * | 9/2013 | Segall | G06T 5/004 348/607 |
| 8,854,421 B2 * | 10/2014 | Kasahara | B60R 1/00 348/222.1 |
| 9,741,099 B2 | 8/2017 | Lim et al. | |
| 10,257,449 B2 * | 4/2019 | Avadhanam | H04N 5/357 |
| 2007/0165962 A1 * | 7/2007 | Smirnov | G06K 9/40 382/260 |
| 2011/0032392 A1 * | 2/2011 | Litvinov | G06T 3/4015 348/241 |
| 2017/0061234 A1 * | 3/2017 | Lim | G06K 9/4661 |

* cited by examiner

*Primary Examiner* — Nizar N Sivji
(74) *Attorney, Agent, or Firm* — Fenwick & West LLP

(57) ABSTRACT

Embodiments relate to enhancing local contrast in an image. A bilateral high pass filter generates a high frequency value for each pixel of an input image, based on a convolution using photometric kernel coefficients associated with other pixels around the pixel. A noise control circuit generates a modulated high frequency value for the pixel based on a noise model for the image defining a noise threshold value for modifying the high frequency value. The modulated high frequency value for the pixel is then combined with a pixel value of the pixel to generate an enhanced value for the pixel. Enhanced values for pixels of the image may be generated to provide the local contrast enhancement for the input image.

19 Claims, 7 Drawing Sheets

PER-PIXEL PHOTOMETRIC CONTRAST ENHANCEMENT WITH NOISE CONTROL

BACKGROUND

1. Field of the Disclosure

The present disclosure relates a circuit for processing images and more specifically to per-pixel photometric contrast enhancement with noise control.

2. Description of the Related Arts

Image data captured by an image sensor or received from other data sources is often processed prior to further processing or consumption. For example, raw image data may be corrected, filtered, or otherwise modified before being provided to subsequent components such as a video encoder. Performing the image processing on a device uses system resources. For example, image processing algorithms may be performed by executing software programs on a central processing unit (CPU). However, the execution on the CPU consumes resources of the CPU and memory, and can interfere with processing of other tasks or increase power consumption.

SUMMARY

Embodiments of the present disclosure relate to local contrast enhancement of an image. To perform the local contrast enhancement for an image, a high frequency value for each pixel of the image is generated based on a convolution using photometric kernel coefficients associated with other pixels in a patch defined around the pixel. A modulated high frequency value for each pixel is generated based on a noise model for the image defining a noise threshold value for modifying the high frequency value. An enhanced value for each pixel is generated by combining the modulated high frequency value for each pixel with a pixel value of each pixel to produce an output image with local contrast enhancement.

BRIEF DESCRIPTION OF THE DRAWINGS

Figure (FIG. 1 is a high-level diagram of an electronic device, according to one embodiment FIG. 2 is a block diagram illustrating components in the electronic device, according to one embodiment.

Figure 1:
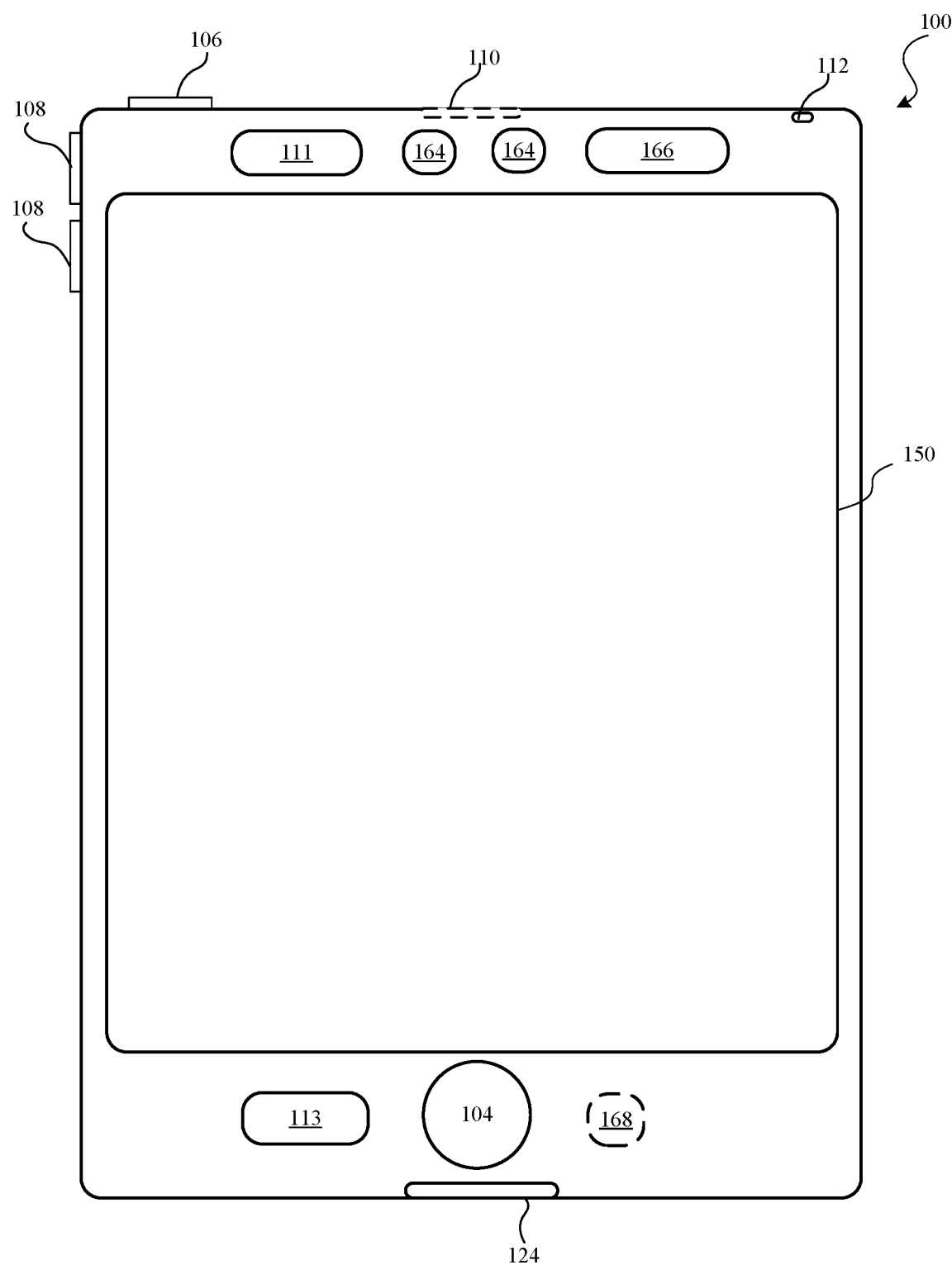

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to enhancing local contrast in an image. The local contrast for a pixel in the image is a luminosity ratio between a brightest pixel and a darkest pixel in a defined vicinity of the pixel (i.e., in a window around a pixel). Thus, the local contrast for the pixel depends upon a size of the window around the pixel. The approach presented in this disclosure enhances the local contrast for a wide range of window sizes. A bilateral high pass filter generates a high frequency value for each pixel of the image, based on a convolution using photometric kernel coefficients associated with other pixels in a patch or window around the pixel. The high frequency value for the pixel is indicative of a level of photometric contrast between the pixel and other pixels in the patch around the pixel. A noise control circuit generates a modulated high frequency value for the pixel based on a noise model for the image defining a noise threshold value for modifying the high frequency value to prevent amplification of noise associated with the pixel. The modulated high frequency value for the pixel is then combined with a pixel value of the pixel to generate an enhanced value for the pixel. Enhanced values for pixels of the image are generated to provide the local contrast enhancement for the image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
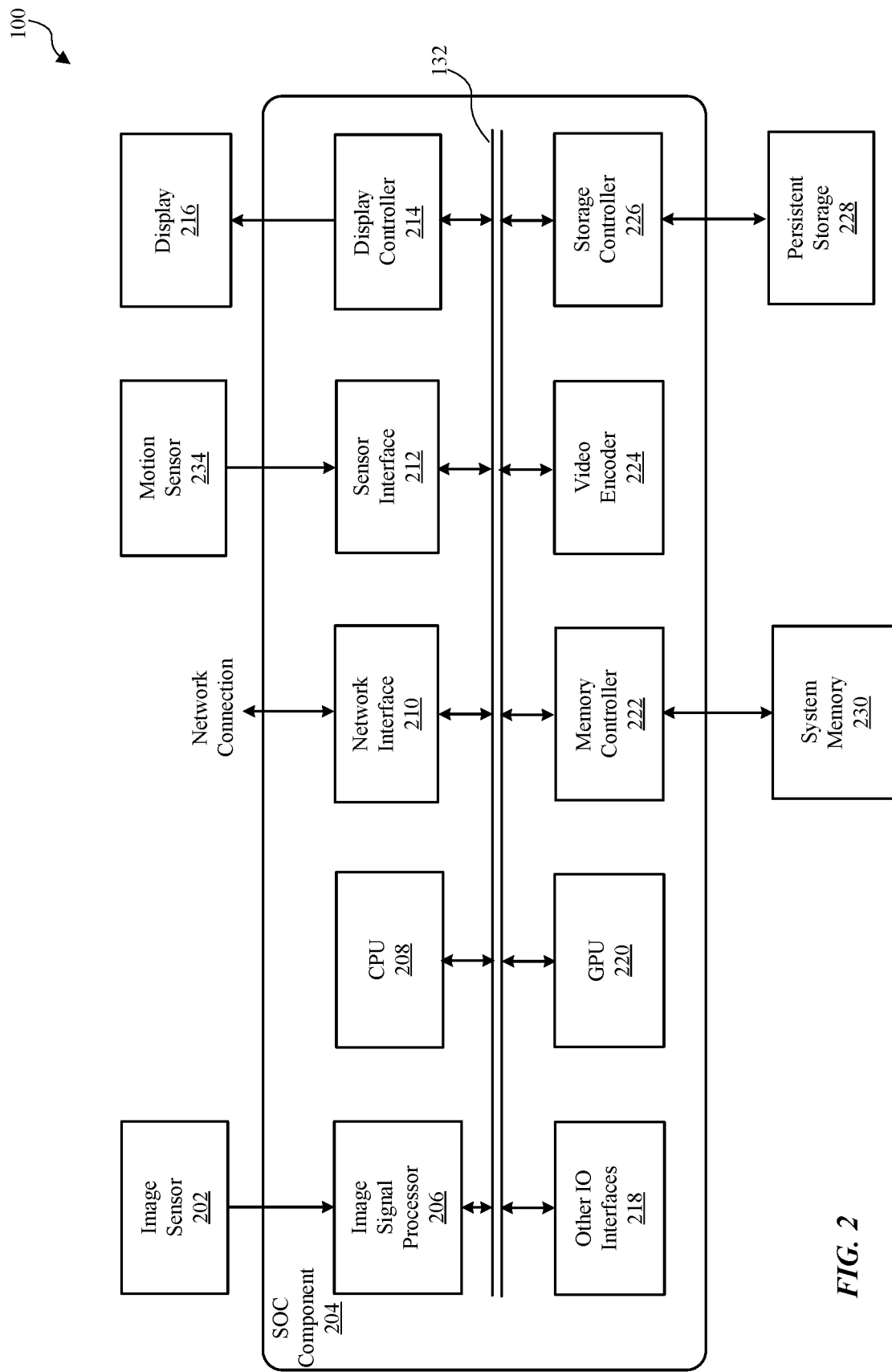

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 106 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
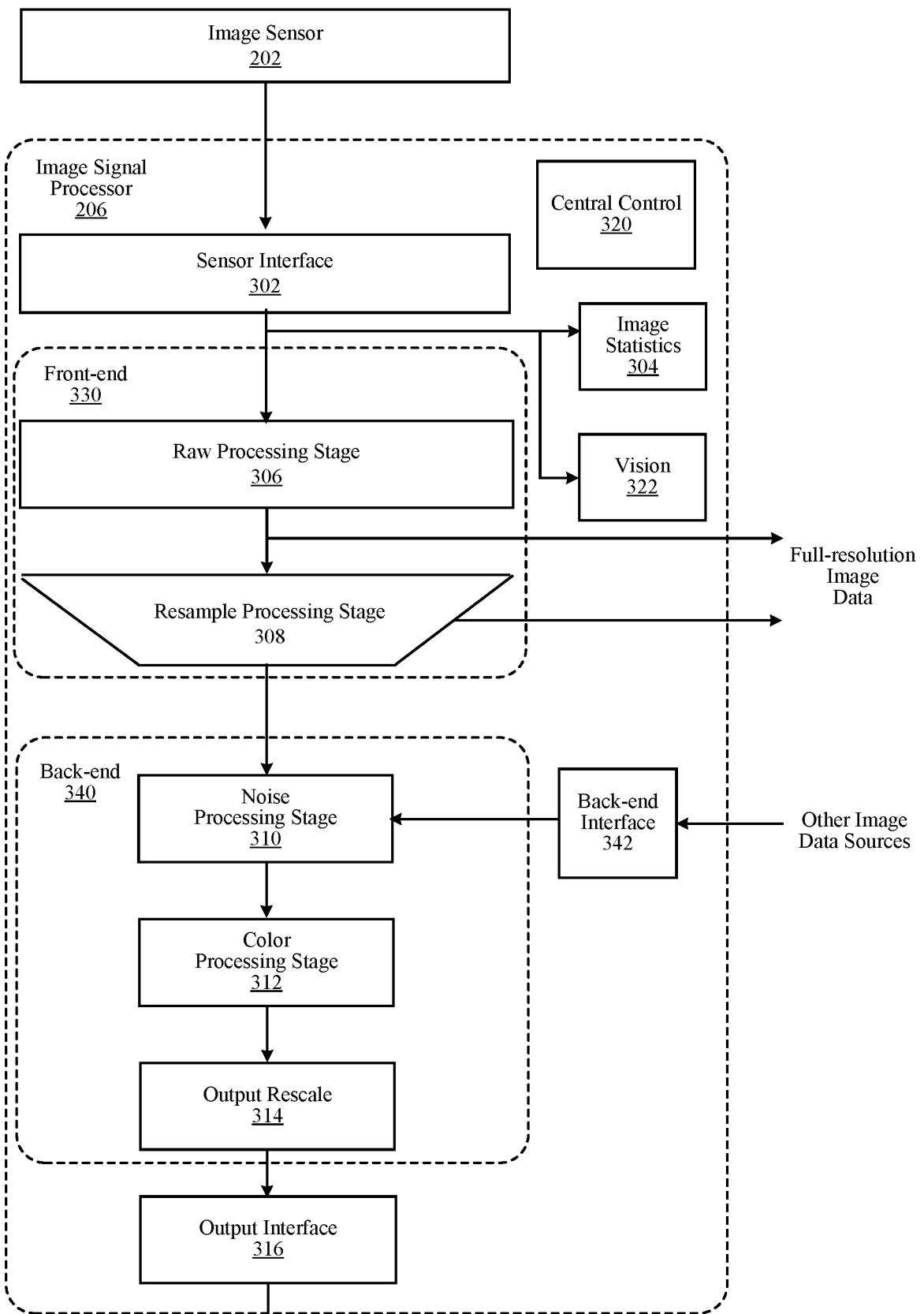
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, local contrast enhancement, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Local contrast enhancement may be applied to enhance local photometric contrasts in image data. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipeline Associated with Local Contrast Enhancement Circuit

Figure 4:
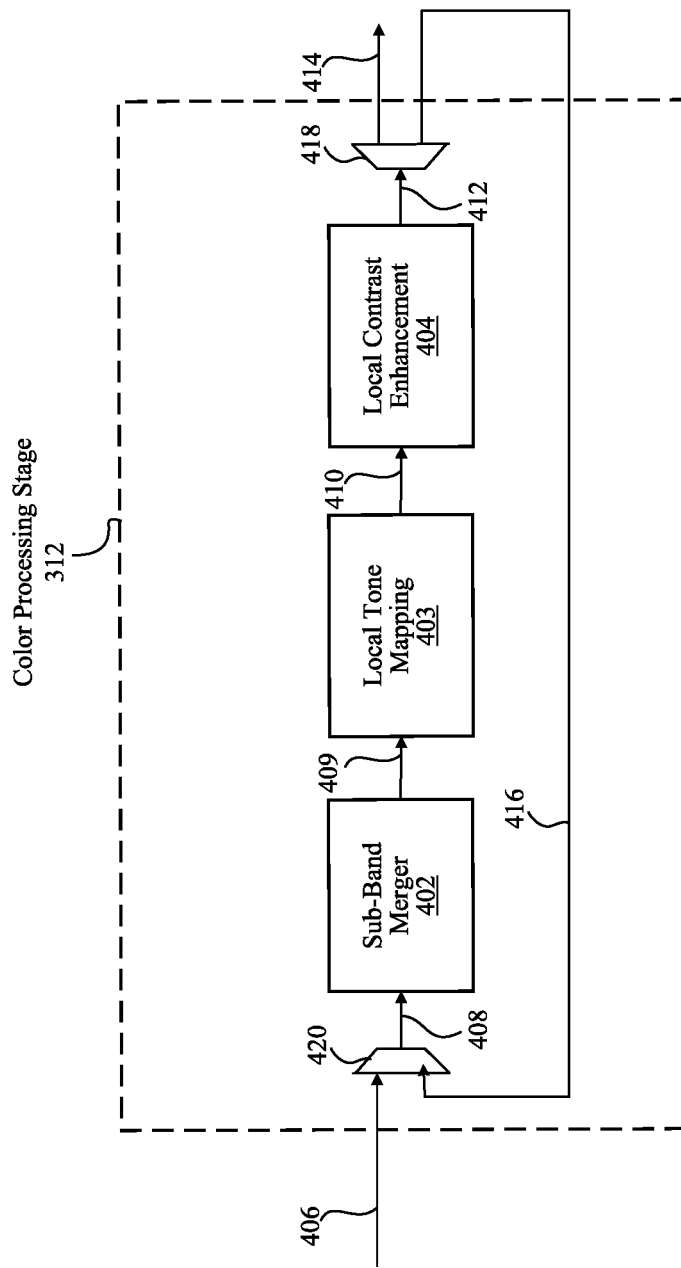
FIG. 4 is a block diagram illustrating a portion of the image processing pipeline including a local contrast enhancement circuit, according to one embodiment.

FIG. 4 is a block diagram illustrating a portion of the image processing pipeline including a local contrast enhancement (LCE) circuit 404, according to one embodiment. In the embodiment of FIG. 4, the LCE circuit 404 is part of color processing stage 312 that also includes, among other components, a sub-band merger (SBM) circuit 402 and a Local Tone Mapping (LTM) circuit 403. In some other embodiments (not shown in FIG. 4), the LCE circuit 404 can be part of noise processing stage 310. The LCE circuit 404 enhances local photometric contrast in image data, such as in de-noised image data.

Circuitry of the noise processing stage 310 applied prior to the color processing stage 312 and the LCE circuit 404 removes a certain level of noise from the image data. However, some residual noise still remains, e.g., in image data 406 being output from the noise processing stage 310 and input into the color processing stage 312 and later into the LCE circuit 404 after being processed by the SBM circuit 402 and the LTM circuit 403. The LCE circuit 404 performs sharpening and enhancing of local photometric contrast in de-noised image data such that the residual noise is not amplified. Contrast enhancement performed by the LCE circuit 404 may be applied only to the luminance component (i.e., Y color component) of the de-noised image data. In other examples, the contrast enhancement is also applied to one or more other components, such as the chroma components Cb and Cr. In some embodiments, an image in another format is converted to the YCbCr format prior to processing by the LCE circuit 404.

Color processing stage 312 receives image data 406 with reduced noise from noise processing stage 310 in FIG. 3. Image data 406 may include one or more color components of a plurality of color components (e.g., Y, Cb and Cr color components). In some embodiments, image data 406 comprises a processed (e.g., de-noised) unscaled version of an input image of a single color component (e.g., Y color component) having a pixel resolution equal to a pixel resolution of the input image. In some other embodiments, image data 406 comprises a processed (e.g., de-noised) downscaled version of the input image having a pixel resolution lower than a pixel resolution of the input image.

In some embodiments, when the image data 406 comprises the processed unscaled version of the input image of the single color component, the SBM circuit 402 merges processed high frequency component of unscaled image data 408 and processed low frequency component of unscaled image data 408 to generate merged unscaled image data 409 having the single color component. The LTM circuit 403 may apply local tone mapping on the unscaled image data 409 to generate merged unscaled image data 410 having the single color component. The LCE circuit 404 applies local contrast enhancement on the single color component of merged unscaled image data 410 to generate enhanced unscaled image data 412 of the single color component, which may be provided as image data 414 to output rescale stage 314 in FIG. 3.

In some other embodiments, when the image data 406 is the processed downscaled version of the input image, the SBM circuit 402 merges processed high frequency component of downscaled image data 408 and processed low frequency component of downscaled image data 408 of a first pixel resolution to generate processed low frequency component image data 409 having a second pixel resolution higher than the first pixel resolution. The processed low frequency component image data 409 may then be processed by the LTM circuit 403 and the LCE circuit 404 and then fed back to the SBM circuit 402 as image data 416 via demultiplexer 418 and multiplexer 420. The image data 416 is then merged with high frequency component of image data 408 of the second pixel resolution. The process of combining the processed high frequency component image data and the processed low frequency component image data is repeated until the SBM circuit 402 and the LCE circuit 404 generates a processed version 414 of input image that is outputted via demultiplexer 418, e.g., for merging with an unscaled version of input image. The LCE circuit 404 may perform local contrast enhancement on a single color component (e.g., Y color component) of one or more versions of processed low frequency component image data 410, wherein each version of processed low frequency component image data 410 has a different pixel resolution lower than the pixel resolution of the input image. Hence, the LCE circuit 404 may be bypassed for certain scales of downscaled image data 410.

In some embodiments, the LTM circuit 403 applies local tone mapping on image data 409 representing scale M of input image, e.g., M=1 and image data 409 is a first downscaled version of input image. The LCE circuit 404 may apply local contrast enhancement on image data 410 representing any scale of input image, e.g., from scale M to the finest scale N, where N≥M. For each scale of input image, the LCE circuit 404 may optimize local contrast in a corresponding support window of pixels of input image, wherein a size of the support window depends on a processed scale of input image.

In some embodiments, the LCE circuit 404 enhances local photometric contrast of a single color component (e.g., Y color component) of image data 410 that is a processed unscaled version of the input image. In some other embodiments, the LCE circuit 404 enhances contrast of a single color component (e.g., Y color component) of image data 410 that is a processed downscaled version of the input image. The LCE circuit 404 enhances contrast of image data 410 based on high pass bilateral filtering followed by signal modulation circuitry that provides noise control. More details about structure and operation of the LCE circuit 404 are provided below in detail in conjunction with FIGS. 5 through 7.

Local Contrast Enhancement Circuit

Figure 5:
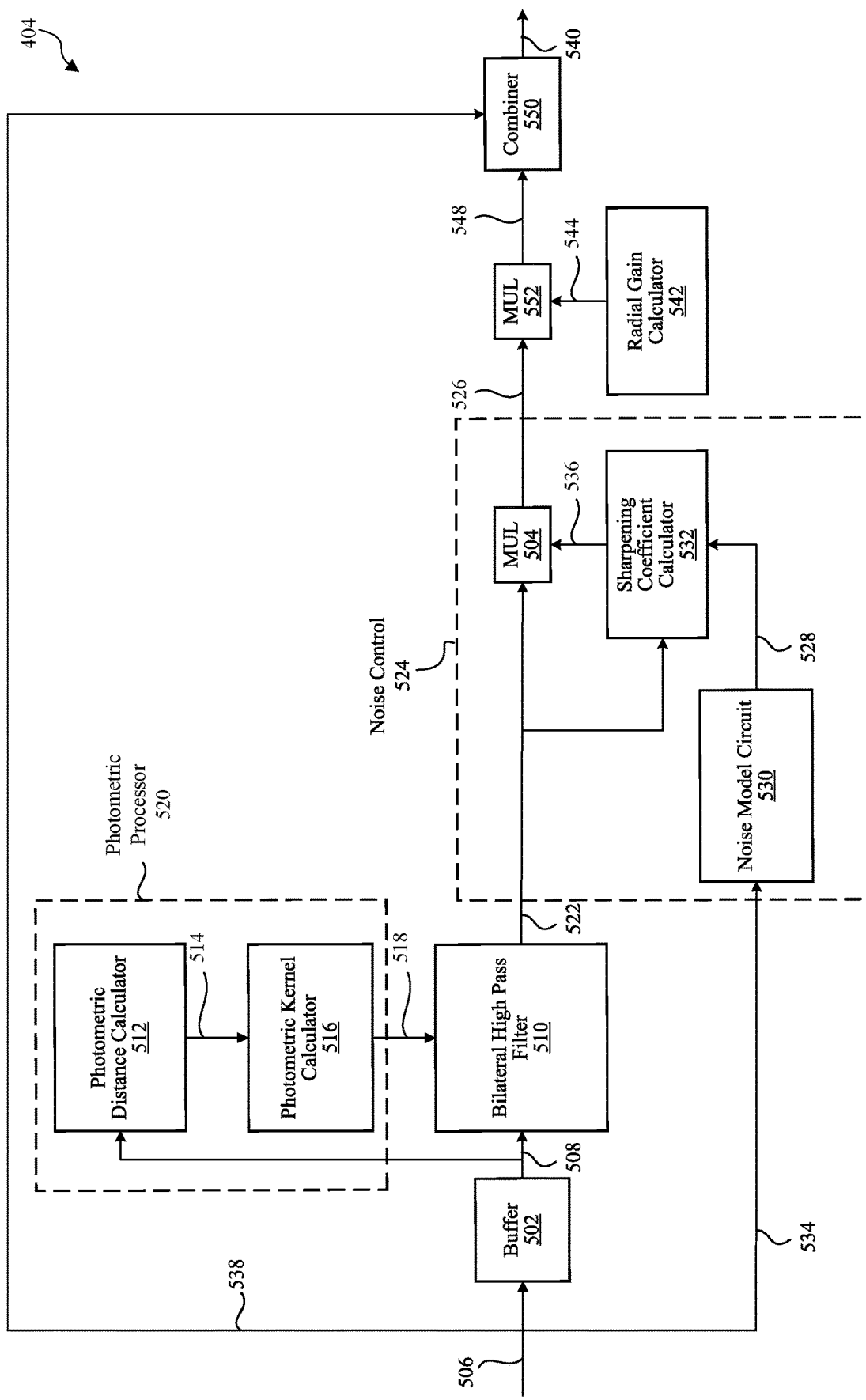
FIG. 5 is a detailed block diagram illustrating a local contrast enhancement circuit, according to one embodiment.

FIG. 5 is a detailed block diagram illustrating the LCE circuit 404 of FIG. 4, according to one embodiment. Buffer 502 receives and stores pixel values for a plurality of pixels of at least a portion of image 506. Image 506 may be a processed (e.g., de-noised) version of the input image. Image 506 may comprise a single color component (e.g., Y color component) of an unscaled version of the input image having a pixel resolution equal to a pixel resolution of the input image. Alternatively, image 506 comprises a plurality of color components (e.g., Y, Cb and Cr color components) of an unscaled version of the input image having a pixel resolution equal to a pixel resolution of the input image. Alternatively, image 506 comprises a plurality of color components (e.g., Y, Cb and Cr color components) of downscaled version of the input image having a pixel resolution lower than the pixel resolution of the input image. At least a portion of the pixel values stored into the buffer 502 corresponding to a patch or convolution window of image 506 are provided as a plurality of pixel values 508 to bilateral high pass filter 510 and photometric distance calculator 512.

For each center pixel of a patch, the photometric distance calculator 512 calculates photometric distances 514 between a pixel value of the pixel and other pixel values of other pixels of the patch. The pixel value may be associated with the pixel having a central position in the patch of image 506, and the other pixel values may be associated with other pixels in the patch of image 506 around the pixel. The patch used for image 506 can be of square shape having spatial width and length of size n, wherein n can be, e.g., 3, 5, 7, etc. For example, a patch may include a 5×5 array of pixels. In one embodiment, the photometric distances 514 are calculated using a single color component (e.g., Y color component) of the pixel value and the other pixel values. In another embodiment, the photometric distances 514 are calculated using a plurality of color components (e.g., Cb, Cr and Y color components) of the pixel value and the other pixel values.

Photometric kernel calculator 516 coupled to photometric distance calculator 512 calculates photometric kernel coefficients 518, based on the photometric distances 514. The photometric kernel coefficients 518 represent measure of photometric similarity between the pixel and the other pixels around the pixel in the patch of image 506. Photometric kernel calculator 516 calculates the photometric kernel coefficients 518 such that values for the photometric kernel coefficients 518 are suitable for mitigating an overshot in the patch of image 506.

In some embodiments, the photometric kernel coefficients 518 can be computed based on the photometric distances 514 as follows:

$$W_p[n,m] = G(MD[n,m]) \quad \text{Equation 1}$$

where MD[n, m] represents a photometric distance 514 (e.g., Mahalanobis distance) between the pixel and a [n, m] pixel in its vicinity within the patch of image 506; G represents any non-linear function (usually Gaussian). In one embodiment, the photometric kernel coefficients 518 can be computed as follows:

$$W_p[n,m] = 1 - \min(1, Tmp \times Slope) \quad \text{Equation 2}$$

$$Tmp = \max(0, k[n,m]MD[n,m] - Knee) \quad \text{Equation 3}$$

where Knee and Slope are function parameters, and k[n, m] represents a spatial adjustment coefficient.

The photometric kernel coefficients 518 obtained by photometric kernel calculator 516 are provided to bilateral high pass filter 510 for performing convolution with the pixel values 508 of plurality of pixels in the patch of image 506. In some embodiments, photometric distance calculator 512 and photometric kernel calculator 516 are separate blocks integrated into a photometric processor 520. In some other embodiments (not shown in FIG. 5), photometric distance calculation and photometric kernel calculation can be performed by a single circuit (e.g., CPU) of the photometric processor 520.

Bilateral high pass filter 510 performs convolution between a single color component (e.g., Y color component) of the pixel values 508 and the photometric kernel coefficients 518 to generate a high frequency value 522 indicative of photometric contrast between the pixel and the other pixels around the pixel in the patch of image 506. Bilateral high pass filter 510 combines domain and range filtering, thereby enforcing both photometric and geometric locality. Bilateral high pass filter 510 generates the high frequency value 522 of the pixel based on similar and nearby pixel values in the patch of image 506. The convolution may include multiplication of pixel values 508 for pixels of the patch with corresponding photometric kernel coefficients 518 to generate multiplied values, and then addition of the multiplied values to generate the high frequency value 522.

Bilateral high pass filter 510 calculates the high frequency value 522 as follows:

$$HP_0 = \Sigma_i \Sigma_j (\overline{P}_0 - \overline{P}_{ij}) C_{ij} = \overline{P}_0 - \Sigma_i \Sigma_j \overline{P}_{ij} C_{ij} = \overline{P}_0 - \overline{LP}_0 \quad \text{Equation 4}$$

wherein $HP_0$ is the high frequency value 522 for the pixel, $\overline{P}_0$ is a photometric intensity (e.g., an intensity of luminance component) of the pixel, $\overline{P}_{ij}$ is photometric intensity (e.g., an intensity of luminance component) of a pixel [i, j] in the patch of image 506 around the pixel, $C_{i,j}$ is a bilateral filter coefficient (after normalization) associated with the pixel [i, j], i.e., the photometric kernel coefficient 518 for the pixel [i, j] determined based on a photometric distance 514 for the pixel [i, j], and $\overline{LP}_0$ represents a low-pass filtered version of the pixel. Thus, according to Equation 4, the high frequency value 522 for the pixel can be defined as a difference between the photometric intensity of the pixel and the low-pass filtered version of the pixel.

As discussed, the LCE circuit 404 may optimize local contrast for each scale of input image within a corresponding support window of pixels of input image. In some embodiments, bilateral high pass filter 510 processes the pixel values 508 in the patch of image 506 of size 5×5. The LCE circuit 404 then enhances local contrast in 5×5 region of input image when image 506 is an unscaled version of input image (i.e., scale 0). If image 506 is a first downscaled version of input image (i.e., scale 1), the LCE circuit 404 enhances local contrast in 10×10 region of input image. If image 506 is a second downscaled version of input image having a lower pixel resolution than the first downscaled version (i.e., scale 2), the LCE circuit 404 enhances local contrast in 20×20 region of input image, and so on for other scales.

The high frequency value 522 generated by bilateral high pass filter 510 is indicative of a level of contrast between the pixel and the other pixels around the pixel in the patch of image 506. The high frequency value 522 is larger if the level of contrast in the patch of image 506 is higher, e.g., when the pixel is located at a boundary between two regions of different brightness when processing is performed on the Y channel. As such, the high frequency value 522 having a value larger than a defined threshold value indicates that the variation at the pixel location is large enough to be considered being above a noise threshold and, therefore, can be amplified to increase the local contrast. In this case, the LCE circuit 404 further enhances contrast of the pixel relative to the other pixels, e.g., by adjusting the pixel value of the pixel with a larger modulated high frequency value. In contrast, when the pixel is located in a smooth region where pixel values are similar to each other (i.e., variations in the region are less than the residual noise level), the high frequency value 522 is smaller. As such, the high frequency value 522 having a value below a defined threshold value indicates that a brightness of the pixel does not substantially differ from an average brightness in the patch of image 506. In this case, the LCE circuit 404 adjusts the pixel value of the pixel with a modulated high frequency value smaller than it would be if the high frequency value 522 was larger than the defined threshold value.

The high frequency value 522 generated by bilateral high pass filter 510 is provided to noise control circuitry 524. Noise control circuitry 524 generates a modulated high frequency value 526 for the pixel based on a noise model for the image 506 defining a noise threshold value 528 for modifying the high frequency value 522 that prevents amplification of residual noise associated with the pixel. This may be achieved by attenuating the high frequency value 522 when the high frequency value 522 is below the threshold value 528, and/or amplifying the high frequency value 522 when the high frequency value 522 exceeds the noise threshold value 528.

Noise control circuitry 524 includes noise model circuit 530 and sharpening coefficient calculator 532. Noise model circuit 530 can be implemented as a storage device (i.e., memory) that stores the noise model. Noise model circuit 530 may store the noise model as a look-up table representing threshold frequency values as a function of pixel values of the image 506, wherein the function depends on one or more components associated with the pixel values. In one example, the function for the threshold frequency value uses the Y component. In another example, the function uses the Y, Cr, and Cb components, or some other combination of color components. Noise model circuit 530 determines the noise threshold value 528 based on the noise model stored in the noise model circuit 530 and at least one color component (e.g., Y color component) of one or more pixel values 534 of the image 506.

Sharpening coefficient calculator 532 determines a modulation signal 536 (i.e., sharpening coefficient) for modulating the high frequency value 522, based at least in part on the high frequency value 522 and the noise threshold value 528. The modulated high frequency value 526 for the pixel is generated by modulating (e.g., scaling) the high frequency value 522 with the modulation signal 536 (sharpening coefficient). Multiplier 504 may perform scaling (i.e., multiplying) of the high frequency value 522 with the modulation signal 536 to generate the modulated high frequency value 526. The modulation signal 536 increases as the high frequency value 522 increases until the high frequency value 522 reaches the noise threshold value 528. The modulated signal 536 is equal to a defined maximum value for the sharpening coefficient when the high frequency value 522 exceeds the threshold value 528. Below the noise threshold value 528, the modulation signal 536 attenuates relative to the maximum value to prevent the noise amplification, e.g., when the high frequency value 522 is small due to residual noise. When the high frequency value 522 exceeds the noise threshold value 528 (e.g., due to a residual noise related to the pixel), the modulation signal 536 is limited to the defined maximum value to prevent unbounded amplification of the high frequency value 522, i.e., to prevent amplification of the residual noise. Having the modulation signal 536 like that provides gradual increase in contrast amplification from no amplification or small amplification in noisy regions to a full desired amplification for image details above a noise threshold level.

Figure 6:
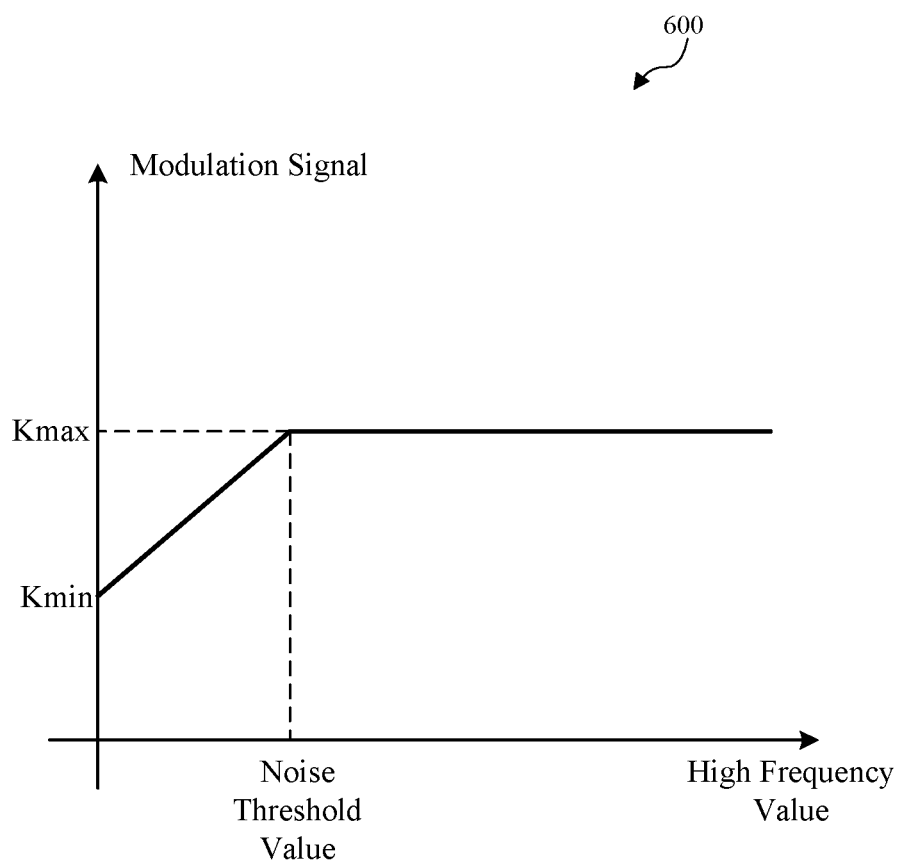
FIG. 6 is a graph illustrating a noise control in a local contrast enhancement circuit, according to one embodiment.

FIG. 6 is a graph 600 illustrating determining the modulation signal 536 (sharpening coefficient) for noise control, according to one embodiment. Sharpening coefficient calculator 532 determines the modulation signal 536 in accordance with the graph 600. As shown by the graph 600, the modulation signal 536 is a function of the high frequency value 522 and the modulation signal 536 further depends on the noise threshold value 528 and the defined maximum value for the sharpening coefficient. For the high frequency value 522 being less than the noise threshold value 528, the modulation signal 536 increases as the high frequency value 522 increases starting with a value of Kmin (e.g., 0<Kmin<Kmax). When the high frequency value 522 reaches and exceeds the noise threshold value 528, the modulation signal 536 does not increase further and equals to the defined maximum value, e.g., Kmax defined by a desired contrast enhancement level. Put another way, the modulation signal 536 provides an attenuation relative to the maximum value Kmax for high frequency values 522 below the noise threshold value 528. In one example, Kmin is 0 and Kmax is 1 to provide attenuation below the noise threshold value 528. The values of Kmin and Kmax may vary, and in some embodiments, may be provided by the noise model of the noise model circuit 530 using an analysis of one or more color components of the image 506.

Referring back to FIG. 5, the modulated high frequency value 526 generated by noise control circuit 524 (or some adjusted version of modulated high frequency value 526) is combined with a single color component (e.g., Y color component) of pixel value 538 of the pixel to generate an enhanced value 540 for the pixel. The modulated high frequency value 526 and the enhanced value 540 are larger if the level of photometric contrast associated with the pixel is larger, thus providing local contrast enhancement with noise control for the pixel. The noise model circuit 530 ensures that residual noise in the image 506 is not amplified. Furthermore, the bilateral high pass filter 510 ensures that the high frequency value 522 is below an upper bound to prevent "overshoot" of the image 506.

Referring back to equation 4, local contract enhancement performed by the LCE circuit 404 mixes the high frequency value $HP_O$ into a single color component pixel value (e.g., pixel luminance) $\overline{P}_O$ as follows:

$$\overline{P}_O^{enh} = \overline{P}_O + K * HP_O \qquad \text{Equation 5}$$

where K is the modulated high frequency value 526 and $\overline{P}_O^{enh}$ is the enhanced value 540 for the pixel. Thus, if the modulated high frequency value 526 is larger, then more high frequency contribution is included in the enhanced value 540 for the pixel.

In some embodiments, the LCE circuit 404 includes radial gain calculator 542 that determines a radial gain 544 for lens compensation, based on information about position of the pixel in the patch of image 506 relative to a central axis of the input image. Images captured through lenses may be distorted depending on lens characteristics, and the radial gain 544 can adjust for the distortions resulting from the lens. For example, lens distortion may increase moving away from a center region of an image. Thus, a radial gain 544 for each pixel may be computed based on the distance of the pixel from a center region of the image 506, and a scaling factor applied to the distance. Multiplier 552 may perform scaling (i.e., multiplying) of the modulated high frequency value 526 for the pixel with the radial gain 544 to generate an adjusted modulated high frequency value 548 for the pixel. Combiner 550 may then add the adjusted modulated high frequency value 548 to the single color component of pixel value 538 to generate the enhanced value 540 for the pixel. This process of local contrast enhancing can be performed for multiple (e.g., all) pixels in image 506. In each cycle, a different patch and center pixel may be processed until an enhanced value 540 is generated for each pixel of image 506.

Example Process for Performing Local Contrast Enhancement

Figure 7:
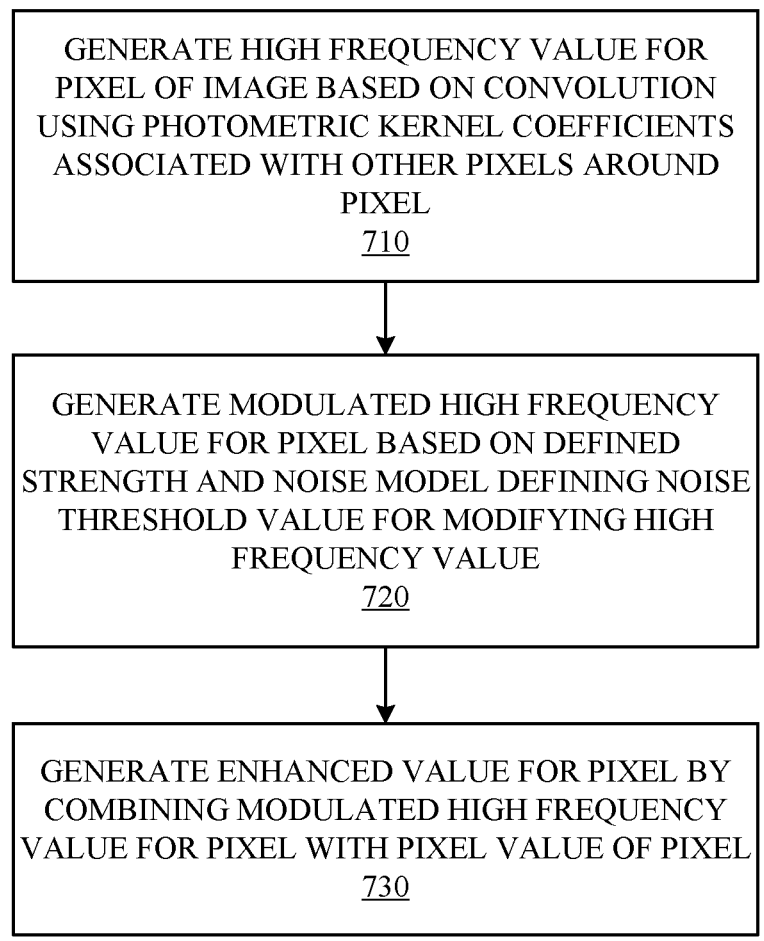
FIG. 7 is a flowchart illustrating a method of local contrast enhancement, according to one embodiment.

FIG. 7 is a flowchart illustrating a method of local contrast enhancement, according to one embodiment. The method may include additional or fewer steps, and steps may be performed in different orders. The LCE circuit 404, as described with reference to FIG. 5, generates 710 a high frequency value for a pixel of an image based on a convolution using photometric kernel coefficients associated with other pixels around the pixel. The LCE circuit 404 receives (e.g. via buffer 502) a patch of the image comprising the pixel and the other pixels. The LCE circuit 404 performs (e.g., via bilateral high pass filter 510) the convolution between a single color component of pixel values of pixels in the patch and the photometric kernel coefficients to generate the high frequency value indicative of photometric contrast of the pixel relative to the other pixels around the pixel.

The LCE circuit 404 generates 720 (e.g., via noise control circuit 524) a modulated high frequency value for the pixel based on a desired strength and a noise model defining a noise threshold value for modifying the high frequency value. The LCE circuit 404 determines (e.g., via noise model circuit 530) the noise threshold value based on the noise model and at least one color component of the pixels of the image. The LCE circuit 404 further determines (e.g., via sharpening coefficient calculator 532) a modulation signal (sharpening coefficient), based at least in part on the high frequency value for the pixel and the noise threshold value. The LCE circuit 404 then modulates the high frequency value for the pixel with the modulation signal to obtain the modulated high frequency value for the pixel.

The LCE circuit 404 generates 730 (e.g., via combiner 538) an enhanced value for the pixel by combining the pixel value of the pixel with the modulated high frequency value for the pixel. The LCE circuit 404 adds the modulated high frequency value for the pixel to a single color component of the pixel value of the pixel to generate the enhanced value for the pixel. In some embodiments, the LCE circuit 404 determines a radial gain based on a position of the pixel relative to a central axis of the image, and adjusts the modulated high frequency value based on the radial gain. The LCE circuit 404 then combines (e.g., adds) the adjusted modulated high frequency value to a single color component of the pixel value of the pixel to generate the enhanced value for the pixel.

The method may be repeated for the pixels of the image to generate an enhanced value for each pixel. In some embodiments, the method is performed to provide local contrast enhancement for the Y component of the image. In some embodiments, the method is repeated to generate multiple channels of enhanced values for each pixel, each for a different color component of the input image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for enhancing an image, comprising:
a bilateral high pass filter configured to generate a high frequency value for each of pixels in the image by performing a convolution between pixel values of other pixels around each pixel and photometric kernel coefficients associated with the other pixels, the high frequency value corresponding to photometric contrast between each pixel and the other pixels, the photometric kernel coefficients determined using photometric distances between a pixel value of each pixel and the pixel values of the other pixels;
a noise control circuit coupled to the bilateral high pass filter, the noise control circuit configured to generate a modulated high frequency value for each pixel based on a noise model for the image defining a noise threshold value for modifying the high frequency value; and
a combiner coupled to the noise control circuit, the combiner configured to generate an enhanced value for each pixel by combining the modulated high frequency value for each pixel with the pixel value of each pixel.

2. The apparatus of claim 1, wherein:
the apparatus further comprises a buffer coupled to the bilateral high pass filter, the buffer configured to receive a patch of the image comprising each pixel and the other pixels; and
the bilateral high pass filter is further configured to perform bilateral high pass filtering of a single color component of the patch of the image based on the convolution with the photometric kernel coefficients to generate the high frequency value for each pixel.

3. The apparatus of claim 1, wherein the noise control circuit is further configured to:
determine the noise threshold value based on the noise model and at least one color component of the image;
determine a sharpening coefficient based at least in part on the high frequency value for each pixel and the noise threshold value; and
scale the high frequency value for each pixel with the sharpening coefficient to obtain the modulated high frequency value for each pixel.

4. The apparatus of claim 3, wherein the combiner is further configured to:
add the modulated high frequency value for each pixel to a single color component of the pixel value of each pixel to generate the enhanced value for each pixel.

5. The apparatus of claim 3, wherein:
the sharpening coefficient is smaller than a defined value, if the high frequency value for each pixel is less than the noise threshold value; and
the sharpening coefficient is equal to the defined value, if the high frequency value for each pixel is larger than the noise threshold value.

6. The apparatus of claim 1, wherein the apparatus further comprises a photometric processor configured to:
determine the photometric distances; and
determine the photometric kernel coefficients using the photometric distances.

7. The apparatus of claim 1, wherein the image comprises an unscaled version of an input image having a pixel resolution equal to a pixel resolution of the input image.

8. The apparatus of claim 1, wherein the image comprises a downscaled version of an input image having a pixel resolution lower than a pixel resolution of the input image.

9. The apparatus of claim 1, further comprising a radial gain calculator circuit coupled to the noise control circuit and the combiner, the radial gain calculator circuit configured to:
determine a radial gain based on a position of each pixel relative to a center region of the image; and
adjust the modulated high frequency value for each pixel based on the radial gain.

10. The apparatus of claim 9, wherein the combiner is further configured to:
add the adjusted modulated high frequency value for each pixel to a single color component of the pixel value of each pixel to generate the enhanced value for each pixel.

11. The apparatus of claim 1, wherein the noise control circuit is further configured to determine the noise model using a look-up table stored in a memory of the apparatus, the look-up table defining frequency values as a function of pixel values of the image for one or more color components.

12. A method for enhancing an image, comprising:
generating a high frequency value for each of pixels in the image by performing a convolution between pixel values of other pixels around each pixel and photometric kernel coefficients associated with the other pixels, the high frequency value corresponding to photometric contrast between each pixel and the other pixels, the photometric kernel coefficients determined using photometric distances between a pixel value of each pixel and the pixel values of the other pixels;
generating a modulated high frequency value for each pixel based on a noise model for the image defining a noise threshold value for modifying the high frequency value; and
generating an enhanced value for each pixel by combining the modulated high frequency value for each pixel with the pixel value of each pixel.

13. The method of claim 12, further comprising:
receiving a patch of the image comprising each pixel and the other pixels; and
performing bilateral high pass filtering of a single color component of the patch of the image based on the convolution with the photometric kernel coefficients to generate the high frequency value for each pixel.

14. The method of claim 12, further comprising:
determining the noise threshold value based on the noise model and at least one color component of the image;
determining a sharpening coefficient based at least in part on the high frequency value for each pixel and the noise threshold value; and
scaling the high frequency value for each pixel with the sharpening coefficient to obtain the modulated high frequency value for each pixel.

15. The method of claim 14, further comprising:
adding the modulated high frequency value for each pixel to a single color component of the pixel value of each pixel to generate the enhanced value for each pixel.

16. The method of claim 12, further comprising:
determining a radial gain based on a position of each pixel relative to a center region of the image; and
adjusting the modulated high frequency value for each pixel based on the radial gain.

17. The method of claim 16, further comprising:
adding the adjusted modulated high frequency value for each pixel to a single color component of the pixel value of each pixel to generate the enhanced value for each pixel.

18. A system, comprising:
an image sensor configured to obtain an image having a plurality of color components;
an image signal processor coupled to the image sensor, the image signal processor configured to perform de-noising of the image to obtain a de-noised version of the image having one or more color components of the plurality of color components, the image signal processor including:
a bilateral high pass filter configured to generate a high frequency value for each of pixels in the de-noised version of the image by performing a convolution between pixel values of other pixels around each pixel and photometric kernel coefficients associated with the other pixels, the high frequency value corresponding to photometric contrast between each pixel and the other pixels, the photometric kernel coefficients determined using photometric distances between a pixel value of each pixel and the pixel values of the other pixels,
a noise control circuit coupled to the bilateral high pass filter, the noise control circuit configured to generate a modulated high frequency value for each pixel based on a noise model for the image defining a noise threshold value for modifying the frequency value, and
a combiner coupled to the noise control circuit, the combiner configured to generate an enhanced value for each pixel by combining the modulated high frequency value for each pixel with the pixel value of each pixel.

19. The system of claim 18, wherein:
the noise control circuit is further configured to:
determine the noise threshold value based on the noise model and at least one color component of the image,
determine a sharpening coefficient based at least in part on the high frequency value for each pixel and the noise threshold value, and
scale the high frequency value for each pixel with the sharpening coefficient to obtain the modulated high frequency value for each pixel; and
the combiner is further configured to add the modulated high frequency value for each pixel to a single color component of the pixel value of each pixel to generate the enhanced value for each pixel.

\* \* \* \* \*